United States Patent [19]
De Souza et al.

[11] Patent Number: 5,205,923
[45] Date of Patent: Apr. 27, 1993

[54] PROCESS FOR HYDROGENATION OF MACRO- AND MICROCRYSTALLINE PARAFFINS

[75] Inventors: Guilherme Lués M. De Souza, Niterói; Antonio Adolfo F. Valle; Rosa Maria P. Wodtke, both of Rio de Janeiro, all of Brazil

[73] Assignee: Petroleo Brasileiro S.A. Petrobras, Rio de Janeiro, Brazil

[21] Appl. No.: 680,475

[22] Filed: Apr. 4, 1991

[30] Foreign Application Priority Data

Jul. 17, 1990 [BR] Brazil .................................. 9003449

[51] Int. Cl.$^5$ ...................... G10G 73/02; G10G 73/38
[52] U.S. Cl. ......................................... 208/27; 208/12; 208/57
[58] Field of Search ............... 208/27, 57, 12

[56] References Cited

U.S. PATENT DOCUMENTS

| | | | |
|---|---|---|---|
| 3,206,387 | 9/1965 | Smilski et al. | 208/27 |
| 3,208,931 | 9/1965 | Wood | 208/27 |
| 4,139,494 | 2/1979 | Itoh et al. | 208/27 |
| 4,186,078 | 1/1980 | Itoh et al. | 208/27 |
| 4,879,265 | 11/1989 | Simpson et al. | 208/216 R |

FOREIGN PATENT DOCUMENTS

1459112 10/1966 France .

Primary Examiner—Theodore Morris
Assistant Examiner—P. Hailey
Attorney, Agent, or Firm—Sughrue, Mion, Zinn, Macpeak & Seas

[57] ABSTRACT

A hydrogenation process for the hydrogenation of macro- and microcrystalline feeds in a mixed bed is disclosed, the first bed containing a catalyst of the demetallization kind, while the second bed contains a hydrotreatment catalyst. During the operation with microcrystalline feed, after the decrease in Saybolt color index, macrocrystalline feed is substituted for microcrystalline feed, whereby is restored the bed catalytic activity which in turn allows the return to the microcrystalline feed, and successively, so that operation is continuous with high Saybolt color index levels maintained for extended periods.

7 Claims, 2 Drawing Sheets

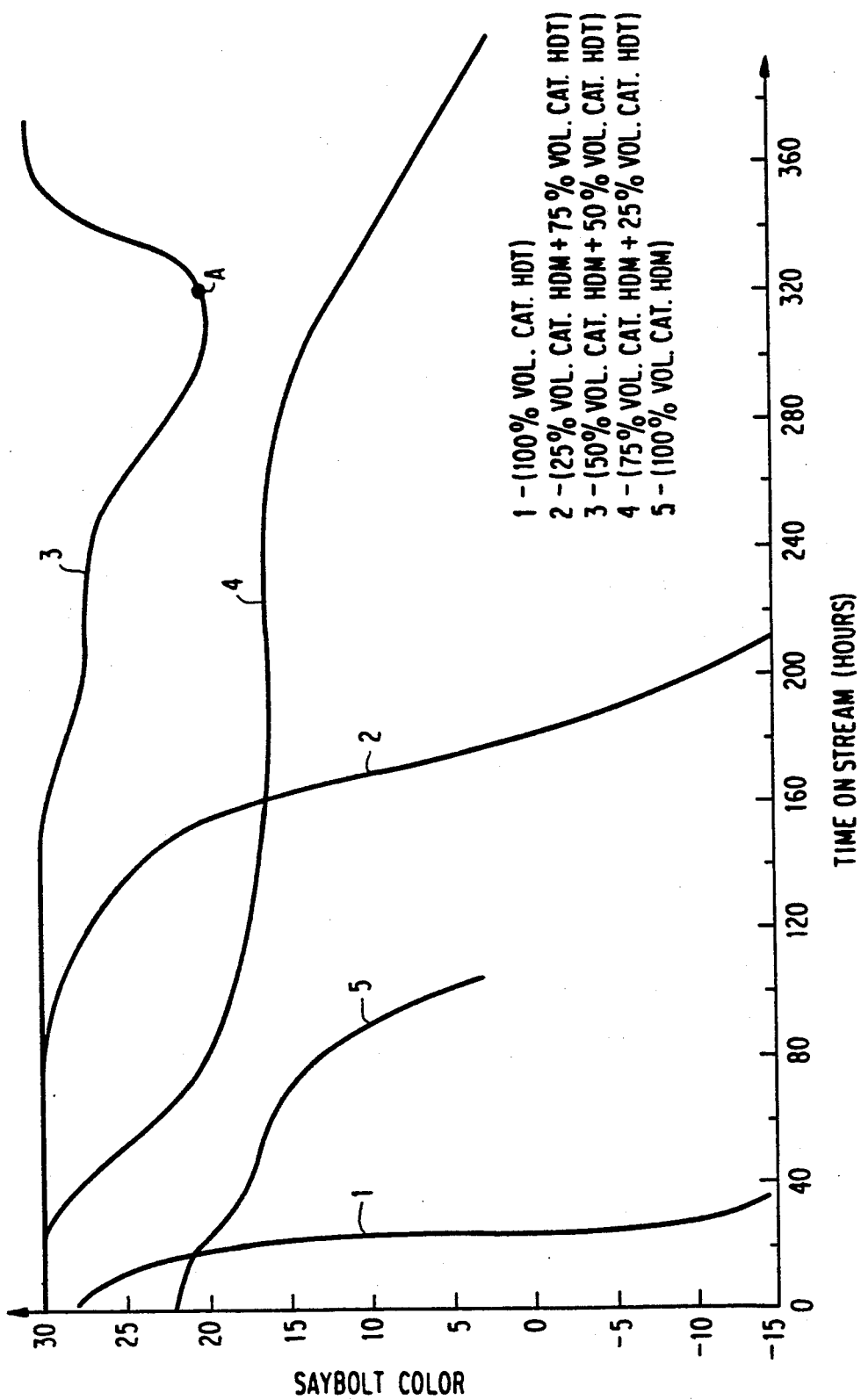

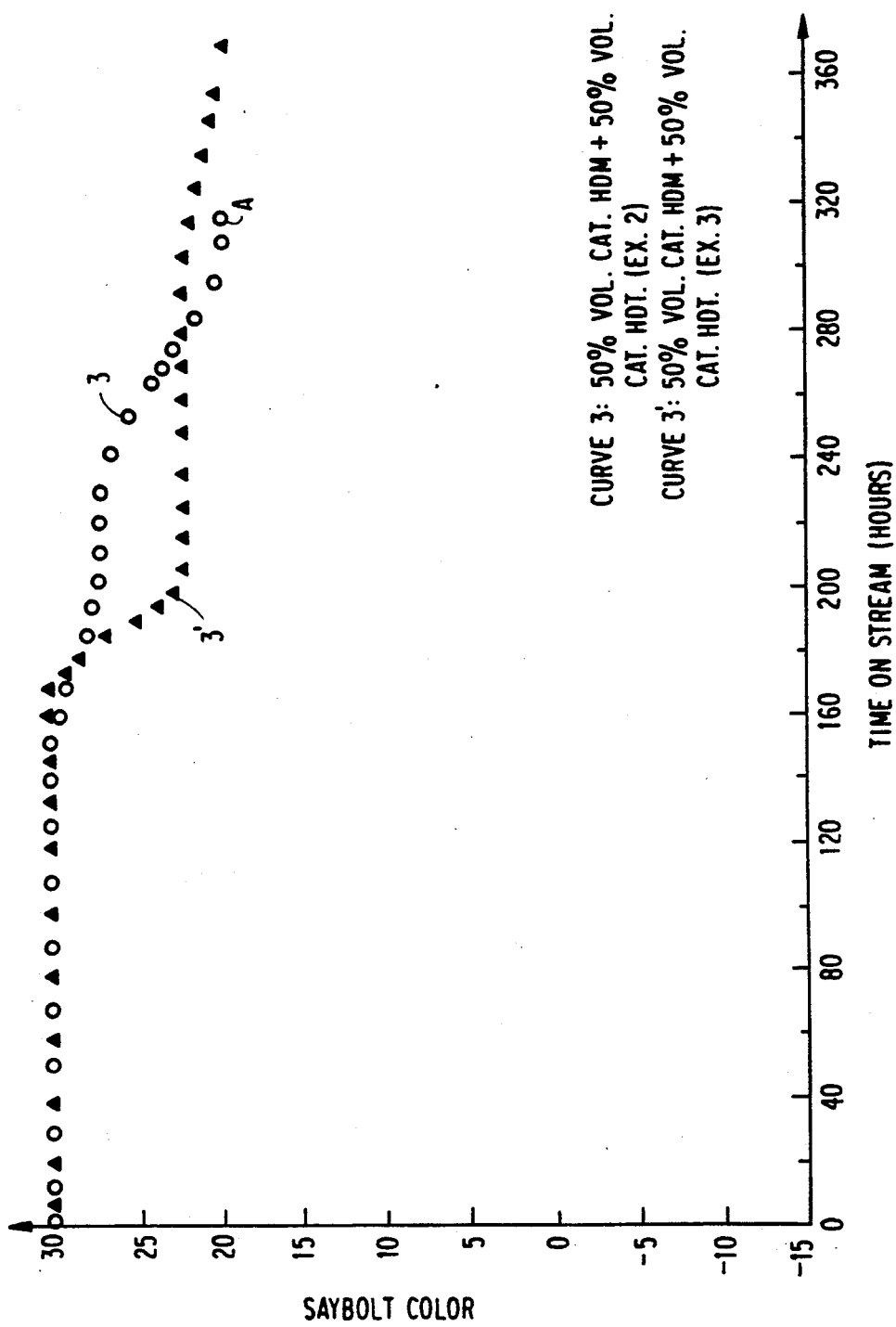

PROCESS FOR HYDROGENATION OF MACRO- AND MICROCRYSTALLINE PARAFFINS

FIELD OF THE INVENTION

The present invention relates to a process for the hydrogenation of macro- and microcrystalline paraffins. More specifically, the present invention relates to a process for the hydrogenation of macro- and microcrystalline paraffins, in a two layer bed, the first reactor bed containing a hydrodemetallization bed on the basis of Ni, Mo and P as oxides or sulfides, on an alumina support, the second bed containing a hydrotreating catalyst on the basis of Ni, Mo and P, whereby paraffins are discolored in a complete and long lasting way. The present invention equally contemplates an alternating process for the hydrogenation of macro- and microcrystalline paraffins, so that for example, a microcrystalline paraffin hydrogenation run is followed by a run for the hydrogenation of macrocrystalline paraffins, the alternation of runs leading to a continuous process operation while Saybolt color indices are kept at high values.

BACKGROUND OF THE INVENTION

It is a well-known fact that the color present in macro- and microparaffins is associated to the presence of small amounts of polyaromatic, aromatic, heterocyclic and unsaturated hydrocarbons, which should be withdrawn from the feedstock to be treated, while avoiding modifications in the typical features such melting, viscosity, penetration and oil content, as well as without cracking or isomerization of the n-paraffins.

The state-of-the-art discloses that, among the various processes used to keep macro- and microcrystalline paraffins at acceptable color levels, such as oleum contact followed by percolation on bauxite or other adsorbents, the catalytic hydrogenation processes applied on the color-forming and oxidation-causing compounds are considered more efficient and economical since these avoid loss of paraffinic stock to the adsorbents and/or handling, regeneration and disposal of products such as sulfuric acid.

PRIOR ART

U.S. Pat. No. 3,208,931 discloses a microcrystalline wax hydrorrefining process in two steps, where the first step is effected under more severe conditions, such as to remove the major part of the color-originating compounds while the second step is effected under milder conditions, in order to convey color stability to the product, the second step being a continuation of the first one and consisting in cooling the reagents by means of a recycle gas stream. The first step catalyst contains from 1 to 5% by weight of Cobalt oxide or sulfide and from 5 to 20% by weight of molybdenum oxide or sulfide, the remaining being activated alumina stabilized by 3 to 15% by weight of silica gel. The second stage catalyst, similarly to that of the first stage, is a sulphur-resistant catalyst. The second bed catalyst can equally be a higher hydrogenation activity catalyst, such as Ni or noble metals such as Pt, Pd or Rd, on a high surface area support such as silica gel, alumina gel, activated gels or type X or Y zeolites. The process is carried out at 305° to 412° C.

French Patent FR 1,459,112 discloses a paraffin catalytic hydrogenation process in two steps, aiming at controlling the product color, odour and stability. In the first step, effected in a first reactor, the raw paraffin is made to contact a catalyst made up of Ni and Mo oxides supported on alumina; in a second step, carried out in a second reactor, placed in series with the first one, the feedstock is made to contact under the same conditions a Ni, Co and Mo oxides catalyst supported on an active charcoal. In the first reactor, the catalyst is 15% by weight $MoO_3$, 5% by weight NiO and 80% by weight alumina, while the second reactor catalyst is 15% by weight $MoO_3$, 4% by weight CoO, 1% by weight NiO and 80% by weight active charcoal. The process is continuous, carried out between 250° and 360° C., $H_2$ flow rate being from 20 to 80 volumes by feed volume. The process can be applied to microcrystalline waxes from residua and to refined (deoiled) paraffins having oil content lower than 1.5% by weight.

U.S. Pat. No. 4,186,078 discloses a paraffin hydrorefining process by which the feed is made to contact hydrogen in the presence of a catalyst which comprises at least a hydrogenating metallic component supported on silica-alumina which contains from 0.2 to 5% by weight of an alkaline metal component, the catalyst surface area being from 200 to 300 $m^2/g$, where a) the pore volume having diameter in the 60 to 150 Å range is higher than 80% of the pore volume having diameter in the zero to 150 Å and b) the pore volume having diameter in the zero to 600 Å is in the range of 0.45 to 0.60 ml/g.

Thus, the microcrystalline wax hydrorefining catalytic processes disclosed in the literature aim at improving color, storage stability and oxidation resistance, chiefly when these paraffins are to be used in the food or medicine field, that is, highly pure paraffins.

However, the cited literature is not clear, concerning the extension of the catalytic on-stream process, that is, the actual process efficacy, since none of these references mention the on-stream period during which the color specification is obeyed, this being an essential feature of the process which is seldom emphasized in the literature. However, the catalytic activity restoration is mentioned in U.S. Pat. No. 3,206,387, which employs a periodical flow of hydrogen sulfide as activator (sulfiding agent) of the molybdena on alumina catalytic bed after, for example, 11 to 12 operation days. Instead of stopping the plant activities in order to regenerate the catalyst, the hydrogen sulfide flow restores catalytic activity so there is no need to change the catalyst inventory in order to obtain a product of the correct specification during long runs. However, the hydrorefining technique for macro- and microcrystalline waxes still needs refinements since, on the one hand, the actual efficacy of most of the proposed catalytic systems is not known, while on the other hand the flow of a gas such as hydrogen sulfide in a hydrogenation reactor entails operational as well as environmental problems.

SUMMARY OF THE INVENTION

Therefore, the main objective of the present invention is to disclose a highly efficient, continuous, catalytic process for the hydrogenation of macro- and microcrystalline waxes, whereby the prolonged, adequate colour levels and long lasting on-stream periods is effected by combining, on the one hand, two catalytic beds arranged in series, and on the other hand by alternating micro- and macrocrystalline feeds, the microcrystalline feed being hydrogenated first; upon reduction of the color level, macrocrystalline wax is substituted for the microcrystalline feed. Thus, by combining the mixed bed and alternating feeds the process can be operated without interruption of the plant for catalytic system regeneration and without the color level being reduced below specification.

PREFERRED EMBODIMENT

The macro- and microcrystalline waxes to which is applied the process of the present invention are the deoiled paraffins from distilled and deasphalted oils, respectively.

The process conditions are usual, that is, temperature between 280°-345° C., pressures between 75 to 150 kg/cm$^2$, H$_2$/feed ratio=150-400 L/L, WHSV=0.20-0.80 h$^{-1}$.

The micro- and macrocrystalline paraffin feeds to be hydrogenated according to the present invention process as well as the hydrogenated product show the physical-chemical characteristics according to Table 1 below:

contacted should contain between 1 and 14 wt % Mo, between zero and 4 wt % Ni, between zero and 4 wt % Co and between zero and 3 wt % P, the active phase being supported on alumina. Catalyst acidity, expressed in milliequivalents of n-butylamine per gram of catalyst is comprised between 0.2 and 1.0. Surface area (BET) is between 100 and 400 m$^2$/g, average pore diameter, measured by the mercury intrusion method is comprised between 7.0 and 40 mm and total pore volume Vpt in ml/g is between 0.4 and 1.2. The pore volume distribution in ml/g as a function of the pore diameter is comprised between the following ranges: 3.0<Vp<10 nm=0.1 to 0.6; 10<Vp<100 nm=0.1 to 0.8; 100<Vp<1000=0.0 to 0.15; 1000 nm<Vp=0.0 to 0.1.

The hydrotreating catalyst should contain between 5 and 20 wt % Mo, between 0.0 and 8.0 wt % Ni, between 0.0 and 8 wt % Co and between 0.0 and 6 wt % P, the active phase being supported on alumina. Catalyst acidity, expressed as milliequivalents of n-butylamine per gram of catalyst, is comprised between 0.4 and 1.4.

TABLE 1

|  | Feed Deoiled parraffin | | Product Hydrogenated Paraffin | |
|---|---|---|---|---|
|  | Micro- | Macro- | Micro- | Macro |
| Density, 20° C. (g/cm$^3$) | 0.8542 | 0.8354 | 0.8435 | 0.8264 |
| Ramsbottom residue (wt %) | 0.14 | 0.10 | 0.04 | 0.04 |
| Sulphur (ppm) | 120 | 53 | 39 | 18 |
| Total Nitrogen (ppm) | 165 | 70 | 70 | 30 |
| Polyaromatics (wt %) | 0.4296 | 0.0475 | 0.0145 | 0.0035 |
| ASTM color | 8.0(+) | 6.0(+) | — | — |
| Saybolt color | — | — | +30 | +30 |
| Penetration, 25° C., 0.1 mm | 15 | 15 | 15 | 15 |
| Melting Point, °C. (°F.) | 83.3(182) | 62.7(145) | 83.3(182) | 62.7(145) |
| Viscosity 90° C./100° C. (cSt) | 20.94/17.68 | 5.53/4.61 | 21.43/17.18 | 5.53/4.61 |
| Flash point, °C. | — | — | 300 | 244 |
| Oil content, wt % | 0.7 | 0.7 | 0.7 | 0.7 |
| FDA test | — | — | passes | — |
| Ni and V content (ppm) | 3 | 3 | 3 | 3 |
| Refractive Index, 90° C. | 1.5161 | 1.4501 | 1.5161 | 1.4501 |
| Asphaltene content (wt %) | 0.05 | 0.05 | 0.05 | 0.05 |

The catalytic process of the present invention is carried out in the presence of two different, previously sulfided catalysts, placed in one single bed (hereinafter designed as a mixed bed), the feedstock being made to contact, in the presence of hydrogen, between 280° and 345° C., first a residuum demetallization catalyst which hydrogens and partially adsorbs the heavy, color-forming compounds, followed by a hydrotreating catalyst, whereby hydrogenation is completed and color stabilization is achieved. The amount of the two kinds of catalysts in the mixed bed can vary within wide limits, although best results are achieved from circa 25% by volume of the hydrodemetallization catalyst, the remaining of the bed being made up of the hydrotreacting catalyst. For amounts lower than approximately 25% by volume of hydrodemetallization (HDM) catalyst, hydrogenation treatment efficiency is reduced, and should be recovered after an on-stream period of up to 4 to 5 days; to achieve this, macrocrystalline feed is substituted for microcrystalline feed, the former having a beneficial effect on the catalytic bed whereby the activity of the catalyst mixed bed is restored with consequent increase in the color level. Up to a certain optimum level, the higher the amount of HDM catalyst in the bed, the longer is kept the paraffin decolorizing level and lesser the need to substitute macrocrystalline feed for microcrystalline paraffin.

The hydrodemetallization catalyst which constitutes that part of the bed with which the feed is initially Surface area (BET) is between 70 and 320 m$^2$/g, the average pore diameter as measured by the mercury intrusion method is between 5.0 and 20 nm and total pore volume Vpt in ml/g is between 0.2 and 0.6. The pore volume distribution in ml/g, as a function of the pore diameter, is comprised between the following ranges: 3.0<Vp<10 nm=0.1 to 0.6; 10<Vp<100 nm=0.0 to 0.6; 100 nm<Vp=0.0 to 0.1.

Color level is evaluated by means of the Saybolt color index, varying from −16 to +30; the higher the color index in this scale, the better is the product regarding purity and oxidation resistance Table 2 below lists standard values for macro- and micro paraffins.

TABLE 2

|  | MACRO | MICRO |
|---|---|---|
| Oil content (wt %) | 1.0 | 1.0 |
| Melting point, °C. (°F.) | 57.2–65.5 (135–150) | — |
| Saybolt color | +17 | +15 |
| Penetration at 25° C. on 0.1 mm | 15 | 15 |
| Flash point, °C. | 200 | 200 |
| FDA test | passes | passes |

Basically, the hydrogenation process according to the present invention is effected by making the micro- or macro-paraffin feed through the mixed bed of hydro demetallization-hydrotreatment catalysts, at a temperature comprised between 280°-345° C. for both steps, hydrogen partial pressures between 75 and 150 kg/cm$^2$, weight hourly space velocity WHSV between 0.20 and 0.80 h$^{-1}$ and H$_2$/feed ratio 150-400 L/L. The mixed bed can contain of from 10 to 95% by volume of hydrodemetallization catalyst, the remaining of the bed volume being made up of hydrotreating catalyst.

The present invention process, therefore, as herein disclosed and claimed, is characterized in that the microcrystalline paraffin feed is made to contact a catalytic bed made up of two catalysts, the first bed consisting in a hydrodemetallization catalyst and the second one consisting in a hydrotreating catalyst, the volume amount of hydrodemetallization catalyst varying of from 25% to 75%.

BRIEF DESCRIPTION OF THE DRAWINGS

FIG. 1 is a plot of on-stream time vs. Saybolt color levels. Curves 1 and 5 show poor color results if single (HDT or HDM) catalysts are used; curves 2 to 4 illustrate the improvement in color obtained by mixed bed (HDM+HDT) catalysts as well as much longer on-stream periods.

FIG. 2 is another plot of on-stream period vs. Saybolt color levels. There is illustrated a comparison between two different mixed beds, both containing equal volume amounts of HDM and HDT catalysts, the only difference being that different HDM catalysts have been employed.

The following Examples illustrate the invention, but should not be construed as a limitation thereof.

EXAMPLE 1

In this Example, a deoiled microparaffin feed was subjected to hydrorefining in a mixed bed made up of 25% by volume of hydrodemetallization catalyst and 75% by volume of the bed made up of a hydrotreating catalyst. Operation conditions were as follows: H$_2$ partial pressure=126 kg/cm$^2$ (1800 psig), T=335° C., WHSV=0.35 h$^{-1}$, H$_2$/feed ratio=200 L/L.

The hydrodemetallization catalyst which constitutes the fraction of the bed with which the feed is initially contacted contains 7 wt % Mo, 2.1 wt % Ni and 1.4 wt % P, the active phase being supported on gamma-alumina. Catalyst acidity, expressed in n-butylamine milliequivalents per gram of catalyst, is 0.42. The pore volume distribution, in ml/g, as a function of the pore diameter, as measured by the mercury intrusion method is as follows: $3.0 < VP < 10$ nm=0.47; $10 < Vp < 100$ nm=0.23; $100 < Vp < 1000$ nm=0.12; $1000$ nm$<Vp$=0.05. The average pore diameter is 9.8 nm, the total pore volume Vpt in ml/g is 0.87, surface area (BET) is 300 m$^2$/g and the bulk density is 0.47 g/cm$^3$.

The hydrotreating catalyst is a catalyst which contains 14 wt % Mo, 3.3 wt % Ni and 3.0 wt % P, active phase being supported on gamma-alumina. Acidity expressed in n-butylamine equivalents per gram of catalyst is 0.71. The catalyst pore volume distribution, in ml/g, as a function of the pore diameter, as measured by the mercury intrusion method is as follows: $3.0 < Vp < 10$ nm=0.36; $10 < Vp < 100$ nm=0.02. The average pore diameter is 8.7 nm, the total pore volume Vpt in ml/g is 0.38, surface area (BET) is 167 m$^2$/g and bulk density is 0.86 g/cm$^2$.

Both hydrodemetallization and hydrotreatment catalysts are commercially available.

In this Example (curve 2 of FIG. 1) Saybolt color was kept stable at $\geq +30$ for 85 hours, thereafter beginning the lowering of the color level; after 110 hours on-stream, color level was +27, while after 280 hours on-stream (not shown in the Figure), a macroparaffin type D feed was substituted for the microparaffin feed, the bed temperature was set at 300° C., while the remaining conditions were kept as before. Immediately after the stabilization of the temperature at 300° C., color level was increased, such that between 310 and 420 hours after the beginning of the process, color had returned to the +17 level. Process operation employing macrocrystalline feed lasted up to the 450$^{th}$ hour, temperature being thereafter increased up to 315° C., color being stabilized at the +16 level; again, temperature was raised up to 335° C., so that at the 485$^{th}$ operation hour, color had raised to the +30 level in the Saybolt scale; macrocrystalline paraffin feed was maintained on stream up to the 500$^{th}$ operation hour, when again deoiled microcrystalline paraffin feed was substituted for the macrocrystalline paraffin, process conditions being kept as before: 335° C., 126 kg/cm$^2$, WHSV=0.35 h$^{-1}$ and H$_2$/feed ratio=200 L/L. After 55 additional operation hours the color level had been reduced to nearly +5, which caused a new feed exchange for macrocrystalline paraffin; further 45 operation hours, color level was again +30; at the 630$^{th}$ operation hour, the catalytic bed temperature was reduced to 315° C., the remaining process conditions being kept as such while color was kept unchanged at $> +30$. Overall on-stream period of time extended, in this Example, for 665 hours, that is, 27 days and 17 hours, the feed alternating process being continued such as to sustain the desired color level.

COMPARATIVE EXAMPLE

In this Example, a deoiled microparaffin feed was contacted with the contents of a single catalytic bed, filled up with a classical hydrotreating catalyst, under the same operation conditions and with the same total catalyst volume as in Example 1. The catalyst is the same as that of the second portion of the mixed bed of Example 1. As illustrated on curve 1 of FIG. 1, not even in the beginning of the operation is it possible to reach Saybolt color level +30; after 5 hours operation color is already at +27 level, while after 34 hours color is −14, which is not acceptable. Thus, the classical treatment using a hydrotreating catalyst for the hydrogenation of microcrystalline paraffins is seen as inadequate, in view of the short on-stream time provided by this single catalyst, as well as a low Saybolt color index product.

EXAMPLE 2

In this Example, the mixed bed contained 50% volume of HDM catalyst and 50% volume of HDT catalyst, the catalysts being the same as in Example 1 and Comparative Example. FIG. 1, curve 3, illustrates the results. It can be seen that on-stream time with microcrystalline feed is still more prolonged than in the case when only 25% by volume of the catalyst bed made up of HDM catalyst. Thus, HDM catalyst acts to extend on-stream period of microcrystalline feed, without exchange to macrocrystalline feed, obtaining thus a fairly increase in the process yield. On curve 3, point A represents the exchange of microcrystalline feed for macrocrystalline feed, whereby color returns to optimum levels.

Other catalyst mixed bed compositions can be set forth, according to economic and/or market necessities, or even according to special feed characteristics.

The Examples set forth hereinbefore can be carried out by means of hydrodemetallization and hydrotreatment catalysts with varying contents of hydrogenating metals, as well as varying physical-chemical characteristics such as surface area, pore volume distribution, average pore diameter, etc. For example, HDM catalyst can have 4.1 wt % Mo, 1.7 wt % Ni and 0.09 wt % P, surface area around 147 m$^2$/g, average pore diameter 14 nm, total pore volume Vpt 0.68 ml/g, pore volume distribution $3.0 < Vp < 10$ nm $= 0.15$, $10 < Vp < 100$ nm $= 0.52$ and $Vp > 100$ nm $= 0.01$.

EXAMPLE 3

This Example relates to the alternative HDM catalyst mentioned before, which contained 4.1 wt % Mo, 1.7 wt % Ni and 0.09 wt % P, surface area and other features being as mentioned before. The amount of the referred to HDM catalyst as related to the HDT catalyst (this HDT catalyst being the same as that of Examples 1 and 2) was 50% by volume. The microcrystalline paraffin feed was subjected, under the same operational conditions, to the action of the cited bed, made up of identical volumetric amounts of the HDM and HDT catalysts. As illustrated in FIG. 2, the HDM catalyst of this Example, although completely adequated to the purpose of the present invention, shows a slightly lower performance as compared to the HDM catalyst employed in Examples 1 and 2. It is interesting to point out that, in FIG. 2, there is an inflexion point, near 170 hours on stream, in which both mixed catalytic beds show a slight lowering in hydrogenating efficiency. However, in the presence of the HDM catalyst of Example 3, the decrease in the hydrogenated paraffin color is more accentuated than that observed for the HDM catalyst of Examples 1 and 2.

This could be explained by the higher content of active phase of the HDM catalyst of Examples 1 and 2 (7 wt % Mo, 2.1 wt % Ni, 1.4 wt % P), as compared to the HDM catalyst of Example 3.

EXAMPLES 4 and 5

These Examples employed the same catalyst of Examples 1 and 2, having a higher content of active phase. The amounts were as follows: in Example 4, 75% by volume of HDM catalyst and 25% by volume of HDT catalyst while Example 5 used 100% by volume of HDM catalyst. These Examples are illustrated by curves 4 and 5 in FIG. 1. A poorer result is observed as the hydrogenation process as is increased the volumetric percentage of HDM catalyst in the catalytic bed. Therefore, there is an optimum amount of each catalyst kind (HDM and HDT) in the mixed catalytic bed, which is situated around 50% by volume of each catalyst type.

Therefore, the present hydrogenation process for macro- and microcrystalline paraffins is extremely flexible and dynamic, allowing operation with hydrodemetallization and hydrotreatment catalysts of varying compositions, provided that be satisfied the conditions referred to in the specification and claims. Besides, the present process can be easily adapted to widely varying kinds of paraffinic feeds, while the product obtained, being food- or pharmaceutical grade, is of high commercial value.

We claim:

1. A process for the hydrogenation of macro- and microcrystalline paraffins which comprises:
   contacting said macro- and microcrystalline paraffins with a catalytic bed comprising a first catalytic bed and a second catalytic bed, the contacting being with the first catalytic bed and then with the second catalytic bed, wherein the first catalytic bed comprises a hydrodemetallization catalyst and the second catalytic bed comprises a hydrotreatment catalyst, wherein the volume amount of the hydrodemetallization catalyst is in the range of from 25% to 75% of the catalytic bed, wherein hydrogen is fed into the catalytic bed with the macro- and microcrystalline paraffins, wherein said hydrodemetallization catalyst comprises between 1 and 14 wt % Mo, between 0 and 4 wt % Ni, between 0 and 4 wt % Co, and between 0 and 3 wt % P, and said hydrotreating catalyst comprises between 5 and 20 wt % Mo, between 0 and 8.0 wt % Ni, between 0 and 8 wt % Co, and between 0 and 6 wt % P, wherein at least once during said process the feed of the microcrystalline paraffin is stopped and the macrocrystalline paraffin is used as the feed, whereby the Saybolt color index is increased as compared to the Saybolt color level obtained while feeding said microcrystalline paraffin, wherein said contacting is at a temperature between 280° and 345° C., at a hydrogen pressure of from 75 to 150 kg/cm$^2$, wherein the hydrogen to macro- and microcrystalline paraffin feed ratio is from 150 to 400 L/L, and wherein the weight hourly space velocity during said contacting is from 0.20 to 0.80 h$^{-1}$, and wherein said contacting is co-current.

2. A process for the hydrogenation of macro- and microcrystalline paraffins as claimed in claim 1, wherein:
   (a) the hydrodemetallization catalyst is supported on alumina, has a catalyst acidity in the range of from 0.2 to 1.0 n-butylamine milliequivalents per gram of catalyst, has a surface area BET between 150 and 400 m$^2$/g, has an average pore diameter of from 7.0 and 40 nm, has a total pore volume between 0.4 and 1.2 ml/g, and has a pore volume distribution in ml/g of $3.0 < Vp < 10$ nm $= 0.1$ to 0.6; $10 < Vp < 100$ nm $= 0.1$ to 0.8; $100 < Vp < 1000 = 0.0$ to 0.15 and 1000 nm $< Vp = 0.0$ to 0.1; and
   (b) the hydrotreatment catalyst is supported on alumina, has an acidity between 0.4 to 1.4 n-butylamine milliequivalents per gram of catalyst, has a BET surface area being in the range of from 70 and 320 m$^2$/g, has an average pore diameter between 5.0 and 20 nm, has a total pore volume in ml/g between 0.2 and 0.6, and has a pore volume distribution in the range of $3.0 < Vp < 10$ nm $= 0.1$ to 0.6; $10 < Vp < 100$ nm $= 0.0$ to 0.6; 100 nm $< Vp = 0.0$ to 0.1.

3. A process for the hydrogenation of macro- and microcrystalline paraffins as claimed in claim 1, wherein the volume amount of each catalyst in the mixed bed is 50%.

4. A process for the hydrogenation of macro- and microcrystalline paraffins as claimed in claim 1, wherein the hydrodemetallization catalyst contains 7.0 wt % Mo, 2.1 wt % Ni and 1.4 wt % P and is supported on gamma-alumina and the hydrotreatment catalyst contains 14 wt % Mo, 3.3 wt % Ni and 3 wt % P, and is supported on gamma-alumina.

5. A process for the hydrogenation of macro- and microcrystalline paraffins as claimed in claim 1, wherein the macro- or microparaffin is previously deoiled before being subjected to the hydrogenation process.

6. A process for the hydrogenation of macro- and microcrystalline paraffins as claimed in claim 1, wherein the average on-stream period of the microcrystalline paraffin feed hydrogenation extends for 170 hours or more, Saybolt color levels are kept at +30 or more, up to at least 360 hours with Saybolt color equal or higher than +20, and up to about 600 hours in the lower limit color specification of +15 in the Saybolt scale, thereafter the macrocrystalline paraffin feed being substituted for the microcrystalline paraffin feed, while the hydrogenation process is continued to upgrade the color levels to near +30, whereafter the microcrystalline feed is substituted for the macrocrystalline feed.

7. A process for the hydrogenation of macro- and microcrystalline paraffins as claimed in claim 1, wherein during said process the feed of the microcrystalline wax is stopped a plurality of times and the macrocrystalline wax is used as the feed a plurality of times.

* * * * *